under 35 U.S.C. 154(b) by 0 days...

United States Patent
Koba et al.

(10) Patent No.: US 10,927,441 B2
(45) Date of Patent: Feb. 23, 2021

(54) HIGH-STRENGTH GALVANIZED HOT-ROLLED STEEL SHEET AND METHOD FOR MANUFACTURING SAME

(71) Applicant: JFE Steel Corporation, Tokyo (JP)

(72) Inventors: Masaki Koba, Tokyo (JP); Yusuke Fushiwaki, Tokyo (JP); Yasunobu Nagataki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 16/481,646

(22) PCT Filed: Jan. 9, 2018

(86) PCT No.: PCT/JP2018/000177
§ 371 (c)(1),
(2) Date: Jul. 29, 2019

(87) PCT Pub. No.: WO2018/142849
PCT Pub. Date: Aug. 9, 2018

(65) Prior Publication Data
US 2019/0390314 A1    Dec. 26, 2019

(30) Foreign Application Priority Data

Jan. 31, 2017   (JP) .............................. JP2017-015694

(51) Int. Cl.
*C23C 2/06*    (2006.01)
*C23C 2/02*    (2006.01)
*C23C 2/26*    (2006.01)
*C22C 38/04*    (2006.01)
*C22C 38/02*    (2006.01)
(Continued)

(52) U.S. Cl.
CPC .............. *C23C 2/06* (2013.01); *B32B 15/01* (2013.01); *B32B 15/013* (2013.01); *B32B 15/04* (2013.01); *B32B 15/043* (2013.01); *B32B 15/18* (2013.01); *C21D 1/60* (2013.01); *C21D 1/667* (2013.01); *C21D 8/0226* (2013.01); *C21D 8/0263* (2013.01); *C21D 8/0405* (2013.01); *C21D 8/0426* (2013.01); *C21D 8/0478* (2013.01); *C21D 8/1222* (2013.01); *C21D 8/1272* (2013.01); *C21D 9/46* (2013.01); *C22C 38/00* (2013.01); *C22C 38/02* (2013.01); *C22C 38/04* (2013.01); *C22C 38/06* (2013.01); *C22C 38/12* (2013.01); *C22C 38/14* (2013.01); *C23C 2/02* (2013.01); *C23C 2/26* (2013.01); *C23C 2/28* (2013.01); *C23C 2/34* (2013.01); *C23C 2/40* (2013.01); *C23C 28/023* (2013.01); *C23C 28/025* (2013.01); *C23C 30/00* (2013.01); *C23C 30/005* (2013.01); *Y10T 428/12757* (2015.01); *Y10T 428/12799* (2015.01); *Y10T 428/12951* (2015.01); *Y10T 428/12958* (2015.01); *Y10T 428/12965* (2015.01); *Y10T 428/12972* (2015.01); *Y10T 428/2495* (2015.01);
(Continued)

(58) Field of Classification Search
CPC .... C23C 2/06; C23C 2/28; C23C 2/02; C23C 2/26; C23C 2/34; C23C 2/40; C23C 30/00; C23C 30/005; C23C 28/023; C23C 28/025; C22C 38/00; C22C 38/02; C22C 38/04; C22C 38/06; C22C 38/12; C22C 38/14; C21D 1/60; C21D 1/667; C21D 8/0263; C21D 8/1222; C21D 8/1272; C21D 8/0426; C21D 8/0478; C21D 8/0226; C21D 8/0405; C21D 9/46; B32B 15/01; B32B 15/013; B32B 15/04; B32B 15/043; B32B 15/18; Y10T 428/12799; Y10T 428/12757; Y10T 428/12951; Y10T 428/12958; Y10T 428/12965; Y10T 428/12972; Y10T 428/2495; Y10T 428/24967; Y10T 428/26; Y10T 428/27
See application file for complete search history.

(56) References Cited

U.S. PATENT DOCUMENTS

| | | | |
|---|---|---|---|
| 9,758,847 B2 | 9/2017 | Miyata et al. | |
| 2010/0040906 A1* | 2/2010 | Irie | ........................... C23C 2/02 |
| | | | 428/684 |
| 2018/0002777 A1* | 1/2018 | Kariya | .................... C22C 38/00 |

FOREIGN PATENT DOCUMENTS

| | | |
|---|---|---|
| JP | 06158254 A | 6/1994 |
| JP | 1081948 A | 3/1998 |

(Continued)

OTHER PUBLICATIONS

Machine Translation, Hosomi et al., JP 2007-262459, Oct. 2007. (Year: 2007).*

(Continued)

*Primary Examiner* — Michael E. La Villa
(74) *Attorney, Agent, or Firm* — RatnerPrestia

(57) ABSTRACT

Provided are a high-strength galvanized hot-rolled steel sheet and a method for manufacturing the steel sheet. A steel sheet has a chemical composition, and a galvanized layer is disposed on the steel sheet. The chemical composition includes, in mass %, C: 0.02% or greater and 0.30% or less, Si: 0.01% or greater and 2.5% or less, Mn: 0.3% or greater and 3.0% or less, P: 0.08% or less, S: 0.02% or less, and Al: 0.001% or greater and 0.20% or less. The galvanized layer has a coating weight per side of 20 to 120 g/m². A surface of the steel sheet has a specific surface area ratio, r, of 2.5 or less, and an amount of Si present in the galvanized layer and an amount of Mn present in the galvanized layer respectively satisfy: amount of Si×r≤0.06, and amount of Mn×r≤0.10.

18 Claims, No Drawings

(51) Int. Cl.
  *C22C 38/06* (2006.01)
  *C22C 38/12* (2006.01)
  *C22C 38/14* (2006.01)
  *C21D 9/46* (2006.01)
  *C21D 8/02* (2006.01)
  *C21D 8/12* (2006.01)
  *C21D 1/60* (2006.01)
  *C21D 1/667* (2006.01)
  *C22C 38/00* (2006.01)
  *C23C 2/28* (2006.01)
  *C23C 2/40* (2006.01)
  *C23C 28/02* (2006.01)
  *B32B 15/01* (2006.01)
  *C21D 8/04* (2006.01)
  *B32B 15/04* (2006.01)
  *B32B 15/18* (2006.01)
  *C23C 30/00* (2006.01)
  *C23C 2/34* (2006.01)

(52) U.S. Cl.
  CPC ...... *Y10T 428/24967* (2015.01); *Y10T 428/26* (2015.01); *Y10T 428/27* (2015.01)

(56) References Cited

FOREIGN PATENT DOCUMENTS

| | | | |
|---|---|---|---|
| JP | 2002317257 A | | 10/2002 |
| JP | 2007239012 A | | 9/2007 |
| JP | 2007-262459 | * | 10/2007 |
| JP | 2008163468 A | | 7/2008 |
| JP | 2008231447 A | | 10/2008 |
| JP | 2013108107 A | | 6/2013 |
| JP | 5958668 B1 | | 8/2016 |
| WO | WO 2016/113780 | * | 7/2016 |

OTHER PUBLICATIONS

International Search Report and Written Opinion for International Application No. PCT/JP2018/000177, dated Feb. 27, 2017—6 pages.
Extended European Search Report for European Application No. 18 747 894.6, dated Jan. 24, 2020, 6 pages.
Chinese Office Action with Search Report for Chinese Application No. 201883009445.2, dated Oct. 26, 2020, 7 pages.

* cited by examiner

HIGH-STRENGTH GALVANIZED HOT-ROLLED STEEL SHEET AND METHOD FOR MANUFACTURING SAME

CROSS REFERENCE TO RELATED APPLICATIONS

This is the U.S. National Phase application of PCT/JP2018/000177, filed Jan. 9, 2018, which claims priority to Japanese Patent Application No. 2017-015694, filed Jan. 31, 2017, the disclosures of these applications being incorporated herein by reference in their entireties for all purposes.

FIELD OF THE INVENTION

The present invention relates to a high-strength galvanized hot-rolled steel sheet having excellent surface appearance, coating adhesion, and post-processing corrosion resistance and to a method for manufacturing the steel sheet. The base metal of the steel sheet is a high-strength hot-rolled steel sheet containing Si and Mn.

BACKGROUND OF THE INVENTION

To date, in the fields of automotive steel sheets and the like, surface-treated steel sheets obtained by imparting corrosion protection properties to a base steel sheet (hereinafter also referred to as base metal) have been used, and particularly, galvanized steel sheets and hot-dip galvannealed steel sheets, which have excellent corrosion protection properties, have been used. Furthermore, hot-rolled steel sheets, which can be manufactured at low cost, have been used as the base steel sheet in some cases.

Typically, galvanized steel sheets are manufactured as follows. A steel sheet obtained by, for example, hot-rolling and cold-rolling a slab is used as the base steel sheet, and the base steel sheet is recrystallization-annealed in an annealing furnace of a CGL and thereafter subjected to hot-dip galvanizing. Furthermore, hot-dip galvannealed steel sheets are manufactured by performing hot-dip galvanizing and thereafter further performing alloying.

For galvanized steel sheets that are used for applications such as those described above, the corrosion resistance of a portion that is subjected to a process such as a hole expansion process is very important, in addition to good surface appearance and coating adhesion. However, galvanized steel sheets containing Si tend to have defects such as bare spots and non-alloyed portions because, in many cases, after pickling, local residual scale and locally formed smut due to excessive pickling are present on the surface. Bare spots are exposed portions of the surface of a steel sheet that arise when, in hot-dip galvanizing, the coating fails to adhere to some portions of the surface of the steel sheet. Bare spots are typically on the order of millimeters in size and therefore are visible.

Several proposals have been made to solve the problems described above. For example, Patent Literature 1 proposes a method as a countermeasure that prevents coating defects such as an alloying failure that may occur during manufacturing of a hot-dip galvannealed steel sheet containing Si, Mn, and P, for example. In the method, shot blasting and brush grinding are performed prior to pickling for descaling of the base metal, which is a hot-rolled steel sheet.

Patent Literature 2 proposes a method for improving the adhesion of a coating film. In the method, a base metal is subjected to surface grinding, heated to 600° C. or higher in a reducing atmosphere, and cooled. The base metal is subjected to hot-dip galvanizing and then to alloying.

Patent Literature 3 proposes a method for improving coating adhesion by forming an internal oxide layer in a surface layer of a steel in the process of hot rolling, and in addition, performing descaling on the rolled steel sheet by high-pressure water spraying.

Patent Literature 4 proposes a method for manufacturing a hot-dip galvannealed steel sheet. In the method, a hot rolled steel sheet or an annealed cold-rolled steel sheet is subjected to light reduction rolling at a rolling reduction ratio of 1.0 to 20% and then to a low-temperature heat treatment in which the steel sheet is held at 520 to 650° C. for five seconds or more, and thereafter, the steel sheet is immersed in a hot-dip galvanizing bath containing, in mass %, Al in an amount of 0.01 to 0.18% and then subjected to alloying.

The method proposed in Patent Literature 1, however, requires that shot blasting and brush grinding be performed on the base metal prior to coating application. The method proposed in Patent Literature 2 requires a grinding process. As such, in both Patent Literature 1 and Patent Literature 2, a costly and laborious process is required, and, therefore, there has been a problem in that productivity decreases.

According to Patent Literature 3, coating adhesion is improved, but there has been a problem in that, during processing, microcracking occurs in the surface layer portion of the steel sheet and the coating layer, with internal oxides acting as initiation sites, and consequently, the corrosion resistance of the processed portion deteriorates.

Furthermore, with the method proposed in Patent Literature 4, a high level coating adhesion that sufficiently corresponds to high strength and processability that are required of current high-strength steel sheets has not been achieved, and therefore the method has not necessarily been beneficial for the corrosion resistance of processed portions.

PATENT LITERATURE

PTL 1: Japanese Unexamined Patent Application Publication No. 6-158254
PTL 2: Japanese Unexamined Patent Application Publication No. 10-81948
PTL 3: Japanese Unexamined Patent Application Publication No. 2013-108107
PTL 4: Japanese Unexamined Patent Application Publication No. 2002-317257

SUMMARY OF THE INVENTION

Aspects of the present invention have been made in view of the above circumstances, and an object according to aspects of the present invention is to provide a high-strength galvanized hot-rolled steel sheet having excellent surface appearance, coating adhesion, and post-processing corrosion resistance and to provide a method for manufacturing the steel sheet.

The present inventors diligently performed studies to solve the problems described above. As a result, it was found that a high-strength galvanized hot-rolled steel sheet having excellent surface appearance, coating adhesion, and post-processing corrosion resistance can be obtained by controlling the surface topography of a steel sheet and the amount of oxides that are present in the surface of the base steel sheet after annealing and prior to coating application.

Aspects of the present invention were made based on the above findings, and a summary thereof is as follows.

[1] A high-strength galvanized hot-rolled steel sheet including a steel sheet having a chemical composition and a galvanized layer disposed on the steel sheet having the chemical composition, the chemical composition including, in mass %, C: 0.02% or greater and 0.30% or less, Si: 0.01% or greater and 2.5% or less, Mn: 0.3% or greater and 3.0% or less, P: 0.08% or less, S: 0.02% or less, and Al: 0.001% or greater and 0.20% or less, with the balance being Fe and incidental impurities, the galvanized layer having a coating weight per side of 20 to 120 g/m$^2$, wherein a surface of the steel sheet having the chemical composition has a specific surface area ratio, r, of 2.5 or less, and an amount (g/m$^2$) of Si present in the galvanized layer and an amount (g/m$^2$) of Mn present in the galvanized layer respectively satisfy: amount of Si×r≤0.06, and amount of Mn×r≤0.10.

[2] The high-strength galvanized hot-rolled steel sheet according to [1], wherein the chemical composition further contains, in mass %, one or more of Ti: 0.01% or greater and 0.40% or less, Nb: 0.001% or greater and 0.200% or less, V: 0.001% or greater and 0.500% or less, Mo: 0.01% or greater and 0.50% or less, and W: 0.001% or greater and 0.200% or less.

[3] A method for manufacturing a high-strength galvanized hot-rolled steel sheet, the method including: hot-rolling and pickling a steel slab having the chemical composition according to [1] or [2]; subsequently, performing rolling by using a roll having a surface roughness (Ra) of 0.3 to 1.0 at a rolling reduction ratio of 1 to 10%; and subsequently, performing hot-dip galvanizing.

[4] The method for manufacturing a high-strength galvanized hot-rolled steel sheet according to [3], wherein, in the hot-rolling, descaling by high-pressure water spraying is performed at an impact pressure of 0.3 MPa or greater and less than 1.8 MPa, after rough rolling and prior to finish rolling, the finish rolling is performed at a finish rolling temperature of 800° C. or higher, and coiling is performed at a coiling temperature of 400 to 650° C.

[5] The method for manufacturing a high-strength galvanized hot-rolled steel sheet according to [3] or [4], wherein, prior to the hot-dip galvanizing, continuous annealing is performed in a furnace atmosphere having a hydrogen concentration of 2 to 30 vol % and a dew point of −60 to −10° C., with a steel sheet end-point temperature being 600 to 950° C.

[6] The method for manufacturing a high-strength galvanized hot-rolled steel sheet according to any one of [3] to [5], the method further including performing alloying after the hot-dip galvanizing.

Note that, in accordance with aspects of the present invention, a "high-strength galvanized hot-rolled steel sheet" refers to a galvanized hot-rolled steel sheet having a tensile strength (TS) of 590 MPa or greater.

Aspects of the present invention make it possible to obtain a high-strength galvanized hot-rolled steel sheet having excellent surface appearance, coating adhesion, and post-processing corrosion resistance. Since the steel sheet exhibits high corrosion resistance even after processing, the steel sheet is effective as a member having a complex shape, and, therefore, aspects of the present invention provide a significant industrial advantage.

DETAILED DESCRIPTION OF EMBODIMENTS OF THE INVENTION

Embodiments of the present invention will now be described in detail.

In the following descriptions, the contents of the elements in the chemical composition of the steel and the contents of the elements in the chemical composition of the coating are all in mass % but are indicated simply with % unless otherwise specified. In addition, the hydrogen concentration is in vol % but is indicated simply with % unless otherwise specified.

According to aspects of the present invention, a high-strength galvanized hot-rolled steel sheet having excellent surface appearance and coating adhesion includes a steel sheet and a galvanized layer disposed on the steel sheet. The steel sheet includes, in mass %, C: 0.02% or greater and 0.30% or less, Si: 0.01% or greater and 2.5% or less, Mn: 0.3% or greater and 3.0% or less, P: 0.08% or less, S: 0.02% or less, and Al: 0.001% or greater and 0.20% or less, with the balance being Fe and incidental impurities. The galvanized layer has a coating weight per side of 20 to 120 g/m$^2$. It is important that a surface of the steel sheet has a specific surface area ratio, r, of 2.5 or less and that the amount (g/m$^2$) of Si present in the galvanized layer and the amount (g/m$^2$) of Mn present in the galvanized layer respectively satisfy: amount of Si×r≤0.06 and amount of Mn×r≤0.10.

Here, the specific surface area ratio, r, corresponds to the ratio (actual surface area/area) of the actual surface area, which is determined by taking into consideration minute irregularities in the surface of the steel sheet, to the area of a two-dimensional plane, which is determined without taking into consideration irregularities in the surface of the steel sheet. The method for measuring the specific surface area ratio is not particularly limited. For example, the specific surface area ratio may be determined by using a laser microscope. Alternatively, the evaluation may be conducted by three-dimensional SEM examination or with a cross-sectional TEM. However, a laser microscope may be optimal because minute irregularities on the order of nanometers can be evaluated over a large area. Furthermore, the amount of Si present in the galvanized layer and the amount of Mn present in the galvanized layer respectively correspond to the amount of Si oxide and the amount of Mn oxide. The oxides are oxides formed in a heat treatment step and incorporated into the galvanized layer as a result of a reaction of the coating bath with the steel sheet to form an FeAl or FeZn alloy phase. Note that the multiplication of the amount of Si or the amount of Mn and the specific surface area ratio, r, is based on the "Wenzel model", which is one of the models that describe the relationship between surface roughness and wettability. This is because, when the surface area of the solid-liquid interface increases by a factor of r due to minute irregularities, Si oxide and Mn oxide in the surface of the steel sheet have a more prominent influence on coatability.

As described above, in accordance with aspects of the present invention, the surface topography of a steel sheet and the amounts of oxides after annealing are controlled to inhibit uneven reaction. Furthermore, local degradation of corrosion resistance in a processed portion is prevented. As a result, a high-strength galvanized hot-rolled steel sheet having excellent surface appearance, coating adhesion, and post-processing corrosion resistance is obtained.

First, the following describes reasons for the limitations on the chemical composition of the steel of the high-strength galvanized hot-rolled steel sheet having excellent surface appearance, coating adhesion, and post-processing corrosion resistance, to which aspects of the present invention are directed.

C: 0.02% or greater and 0.30% or less

The formability of a base metal improves as the C content decreases, but the presence of C increases the strength of the steel sheet inexpensively. Accordingly, the C content is greater than or equal to 0.02%. It is preferable that the C content not be less than 0.04%. It is more preferable that the C content not be less than 0.06%. On the other hand, the presence of an excessive amount of C reduces the toughness and weldability of the steel sheet. Accordingly, the C content is less than or equal to 0.30%. It is preferable that the C content not be greater than 0.20%.

Si: 0.01% or greater and 2.5% or less

Si is effective as a solid solution strengthening element and needs to be present in an amount of 0.01% or greater to increase the strength of the steel sheet. However, the presence of an excessive amount of Si degrades wettability during hot-dip galvanizing and degrades reactivity for alloying, which makes adjustment of alloying difficult and results in a deterioration of coating appearance and coating adhesion. For these reasons, the Si content is 0.01% or greater and 2.5% or less. It is preferable that the Si content be 0.03% or greater and 2.00% or less.

Mn: 0.3% or greater and 3.0% or less

Mn is an element useful for increasing the strength of steel. To produce this effect, Mn needs to be present in an amount of 0.3% or greater. However, the presence of an excessive amount of Mn degrades wettability during hot-dip galvanizing and degrades reactivity for alloying, which makes adjustment of alloying difficult and results in a deterioration of coating appearance and coating adhesion. For these reasons, the Mn content is 0.3% or greater and 3.0% or less. It is preferable that the Mn content be 0.3% or greater and 2.6% or less. It is more preferable that the Mn content be 1.0% or greater and 2.2% or less.

P: 0.08% or less

If P is present in an amount greater than 0.08%, weldability deteriorates and surface quality deteriorates. Furthermore, alloying needs to be performed at an increased alloying temperature; otherwise, it is impossible to obtain a desired alloying degree. If the alloying temperature is increased, however, the ductility of the base metal steel sheet deteriorates and the adhesion of the hot-dip galvannealed layer deteriorates. Accordingly, the P content is less than or equal to 0.08%. It is preferable that the P content not be greater than 0.03%. The lower limit of the P content is not particularly limited, but reducing the P content more than necessary may increase the cost. Accordingly, it is preferable that the P content not be less than 0.001%.

S: 0.02% or less

Segregation of S at grain boundaries or formation of large amounts of MnS reduces toughness, and therefore the S content needs to be less than or equal to 0.02%. It is preferable that the S content not be greater than 0.005%. The lower limit of the S content is not particularly limited, and the content may be similar to that of impurities.

Al: 0.001% or greater and 0.20% or less

Al is included for the purpose of deoxidation of molten steel. If the content is less than 0.001%, the purpose is not achieved. On the other hand, if Al is present in an amount greater than 0.20%, large numbers of inclusions are formed, which causes a defect in the steel sheet. Accordingly, the Al content is 0.001% or greater and 0.20% or less. It is preferable that the Al content be 0.005% or greater and 0.1% or less.

The balance is Fe and incidental impurities.

In accordance with aspects of the present invention, for the purpose described below, one or more of the following may be further included, in mass %, Ti: 0.01% or greater and 0.40% or less, Nb: 0.001% or greater and 0.200% or less, V: 0.001% or greater and 0.500% or less, Mo: 0.01% or greater and 0.50% or less, and W: 0.001% or greater and 0.200% or less.

Ti, Nb, V, Mo, and W are elements necessary to cause precipitation of precipitates (carbides, in particular) in the base steel sheet, and it is preferable to add one or more selected from the group consisting of these elements. In general, in many cases, these elements are present in the form of precipitates containing these elements, in the base steel sheet. Of these elements, Ti, in particular, is an element having a high precipitation-strengthening ability and being effective from a cost standpoint. If the Ti content is less than 0.01%, however, the amount of precipitates in the base steel sheet necessary for ensuring that precipitates (carbides, in particular) are included in the hot-dip galvannealed layer may be insufficient. If the Ti content is greater than 0.40%, the effect is saturated and the cost increases. Accordingly, when Ti is to be included, the Ti content is 0.01% or greater and 0.40% or less. It is more preferable that the Ti content not be less than 0.02%.

Likewise, when Nb, V, Mo, and W are to be included, the contents are as follows, for reasons similar to those for the upper limit and the lower limit of the range of the Ti content. The Nb content is 0.001 to 0.200%, the V content is 0.001 to 0.500%, the Mo content is 0.01 to 0.50%, and the W content is 0.001 to 0.200%.

Next, the geometries of the galvanized layer and the base steel sheet will be described.

In accordance with aspects of the present invention, the galvanized layer has a coating weight per side of 20 to 120 $g/m^2$. If the coating weight is less than 20 $g/m^2$, ensuring corrosion resistance is difficult. It is preferable that the coating weight not be less than 30 $g/m^2$. On the other hand, if the coating weight is greater than 120 $g/m^2$, coating peel-off resistance deteriorates. It is preferable that the coating weight not be greater than 90 $g/m^2$.

The specific surface area ratio, r, of the surface of the base steel sheet is less than or equal to 2.5. It is preferable that the specific surface area ratio be as low as possible. If the specific surface area ratio is high, coating wettability significantly deteriorates even when the amounts of Si oxide and Mn oxide formed during annealing are small. In addition, in the case where the specific surface area ratio is high, there is a tendency for the unevenness of the coating weight to increase. If the specific surface area ratio, r, is greater than 2.5, powdering resistance and post-processing corrosion resistance noticeably deteriorate. It is preferable that the specific surface area ratio, r, not be greater than 2.3. The lower limit of the specific surface area ratio, r, is not particularly limited, but, when rolling is performed with rolls provided with a roughness, it is theoretically impossible to obtain a steel sheet surface that is in a completely smooth condition (r=1). Accordingly, it is preferable that the specific surface area ratio, r, not be less than 1.1.

Si oxide and Mn oxide formed in a heat treatment step prior to coating application are incorporated into the galvanized layer when the coating bath reacts with the base steel sheet to form an FeAl or FeZn alloy phase. If the amount of Si oxide and the amount of Mn oxide are excessive, Si oxide and Mn oxide remain at the interface of the coating and the base steel, which degrades coating adhesion. Accordingly, there is no lower limit to the amounts of Si oxide and Mn oxide to be present in the galvanized layer, and it is preferable that the amounts be as low as possible. Specifically, it is necessary that the amounts of Si and Mn in the galvanized layer respectively satisfy: amount of Si×r≤0.06 and amount of Mn×r≤0.10. If the amounts of Si and Mn in the galvanized layer are greater than 0.06 g/m² and greater than 0.10 g/m², respectively, the reaction for forming an FeAl or FeZn alloy phase is insufficient, which results in formation of bare spots and a decrease in coating peel-off resistance. Note that the amounts of Si and Mn in the galvanized layer are measured using a method described in "Examples".

Next, a method for manufacturing the high-strength galvanized hot-rolled steel sheet having excellent surface appearance, coating adhesion, and post-processing corrosion resistance will be described.

A steel slab having a chemical composition as described above is subjected to hot rolling and pickling and is thereafter rolled with rolls having a surface roughness (Ra) of 0.3 to 1.0 at a rolling reduction ratio of 1 to 10% and then subjected to hot-dip galvanizing. It is preferable that the hot rolling be performed in the following manner. After rough rolling and prior to finish rolling, descaling is performed by high-pressure water spraying at an impact pressure of 0.3 MPa or greater and less than 1.8 MPa, finish rolling is performed at a finish rolling temperature of 800° C. or higher, and coiling is performed at a coiling temperature of 400 to 650° C. Furthermore, it is preferable that, prior to hot-dip galvanizing, continuous annealing be performed in a furnace atmosphere having a hydrogen concentration of 2 to 30 vol % and a dew point of −60 to −10° C., with the steel sheet end-point temperature being 600 to 950° C. Furthermore, after hot-dip galvanizing, alloying may be further performed.

Hot Rolling

Hot Rolling Starting Temperature (Slab Heating Temperature) (Preferable Condition)

To disperse fine precipitates of Ti, Nb, and the like, it is necessary to first dissolve Ti, Nb, and the like in the steel before performing hot rolling. Accordingly, it is preferable that the heating temperature prior to hot rolling (slab heating temperature) not be lower than 1100° C. On the other hand, if the slab is heated to higher than 1300° C., internal oxidation in a surface layer of the steel may be promoted, and consequently, surface properties may deteriorate. Accordingly, it is preferable that the slab heating temperature, prior to hot rolling, be 1100° C. or higher and 1300° C. or lower.

Descaling by High-Pressure Water Spraying (Preferable Condition)

It is preferable that, after rough rolling and prior to finish rolling, descaling by high-pressure water spraying be performed at an impact pressure of 0.3 MPa or greater and less than 1.8 MPa. If the impact pressure of high-pressure water for the descaling by high-pressure water spraying is less than 0.3 MPa, large amounts of scale remain, which may cause scale defects. In general, it is preferable that the impact pressure for descaling by high-pressure water spraying be high from the standpoint of scale exfoliation. In particular, for steel sheets containing Si, which have poor scale exfoliation properties, high-pressure descaling is typically used. However, variations in impact pressure in the steel sheet width direction occur depending on the distance from nozzles and as a result of interference of high-pressure water from adjacent descaling nozzles, and, consequently, variations in scale exfoliation may occur. Even in the case where neither the coating weight nor the alloying degree is uneven, regions that experience uneven scale exfoliation may have streaks after alloying because of the difference in surface properties. The unevenness in the steel sheet width direction tends to occur noticeably when the impact pressure is 1.8 MPa or greater. Accordingly, it is preferable that the impact pressure be 0.3 MPa or greater and less than 1.8 MPa. It is more preferable that the impact pressure be 0.5 MPa or greater and 1.6 MPa or less.

Finish Rolling Temperature (Preferable Condition)

It is preferable that the finish rolling temperature not be lower than 800° C. because such a temperature reduces deformation resistance for hot rolling, thereby facilitating operation. On the other hand, if finish rolling is performed at a temperature higher than 1000° C., scale defects may tend to occur, which may result in a deterioration of surface properties. Accordingly, it is preferable that the finish rolling temperature not be lower than 800° C. It is preferable that the finish rolling temperature not be higher than 1000° C. It is more preferable that the finish rolling temperature be 850° C. or higher and 950° C. or lower.

Hot Rolling Coiling Temperature (Preferable Condition)

The steel sheet according to aspects of the present invention contains easy oxidability elements, examples of which include Si, Mn, and Ti. Accordingly, for inhibiting excessive oxidation of the steel sheet and ensuring good surface properties, a preferable coiling temperature is not higher than 650° C. On the other hand, if the coiling temperature is lower than 400° C., the coil tends to have poor properties due to uneven cooling, and, therefore, productivity may decrease. Accordingly, it is preferable that the hot rolling coiling temperature be 400° C. or higher and 650° C. or lower.

Pickling

The hot-rolled steel sheet obtained by hot rolling is subjected to pickling for descaling and thereafter to light rolling. The pickling is not particularly limited and may be performed by using a known method. Note that rolling of 5% or less may be performed at a stage prior to pickling. Such light rolling improves descalability and leads to improved surface properties.

Rolling

Rolling is performed with rolls having a surface roughness (Ra) of 0.3 to 1.0 at a rolling reduction ratio of 1 to 10%. The rolling is performed after the hot rolling and the pickling to improve the coatability of the surface of the steel sheet. Here, performing rolling with rolls having a surface roughness enables efficient correction of the surface topography of the hot-rolled sheet, which has irregularities such as scale portions. When the roughness (Ra) of the roll surface is 0.3 or greater, recess portions of the hot-rolled sheet can be rolled efficiently, which leads to improved coatability. On the other hand, if the roughness (Ra) is greater than 1.0, uneven coating weights and local stress concentration during bending are induced, which can cause a poor coating appearance, decreased powdering resistance, and decreased post-processing corrosion resistance. It is more preferable that the roughness (Ra) not be greater than 0.8.

The rolling reduction ratio for rolling is 1% or greater and 10% or less. By performing reduction rolling, the surface topography is controlled and residual stress is introduced into the surface of the base metal. When the rolling reduction ratio is greater than or equal to 1%, sufficient residual stress is introduced, which improves the coating adhesion of the surface of the steel sheet. If the rolling reduction ratio is greater than 10%, the coating adhesion improvement effect is saturated, and in addition, large numbers of dislocations are introduced into a surface layer of the steel sheet, and, consequently, the structure in the surface layer coarsens during annealing prior to coating application, which leads to a decrease in strength.

Annealing (Preferable Condition)

It is preferable that, prior to hot-dip galvanizing, continuous annealing be performed in a furnace atmosphere having a hydrogen concentration of 2 to 30% and a dew point of −60 to −10° C., with the steel sheet end-point temperature being 600 to 950° C. If the steel sheet end-point temperature, that is, the annealing temperature is a temperature lower than 600° C., the oxide film after pickling cannot be completely reduced, and consequently, it may be impossible to obtain desired coating properties. Furthermore, if the temperature is higher than 950° C., Si, Mn, and the like are concentrated in the surface, which may degrade coatability. It is more preferable that the annealing temperature be 650° C. or higher and 900° C. or lower.

It is preferable that the furnace atmosphere have a hydrogen concentration of 2 to 30% and a dew point of −60 to −10° C. It is sufficient that the furnace atmosphere be a reducing atmosphere, and an atmosphere having a hydrogen concentration of 2 to 30%, a dew point of −60 to −10° C., and a balance of an inert gas is suitable. If the dew point is higher than −10° C., Si oxide that is formed in the surface of the steel sheet tends to be in the form of a film. On the other hand, dew points lower than −60° C. are industrially difficult to realize. If the hydrogen concentration is lower than 2%, reducibility is low. When the hydrogen concentration is lower than or equal to 30%, a sufficient reducing ability can be obtained. It is more preferable that the dew point be −55° C. or higher and −20° C. or lower. It is more preferable that the hydrogen concentration be 5% or greater and 20% or less.

Hot-Dip Galvanizing

After reduction-annealing the steel sheet, hot-dip galvanizing is performed in a continuous hot-dip galvanizing line by using a hot-dip galvanizing bath.

For example, the composition of the hot-dip galvanizing bath is such that the Al concentration is within a range of 0.01 to 0.25% and the balance is Zn and incidental impurities. If the Al concentration is less than 0.01%, a Zn—Fe alloying reaction may occur during galvanizing and a brittle alloy layer may develop along the interface of the coating and the steel sheet, which may degrade coating adhesion. If the Al concentration is greater than 0.25%, an Fe—Al alloy layer grows noticeably, which impairs coating adhesion. The temperature of the coating bath does not need to be particularly limited and may be 440° C. or higher and 480° C. or lower, which is a usual operation range.

Alloying

If the alloying temperature is higher than 550° C., a Γ phase, which is hard and brittle, is formed noticeably at the interface of the (base) steel sheet and the coating film during alloying, and as a result, surface roughness may increase and powdering resistance may deteriorate. Accordingly, it is preferable that the alloying temperature not be higher than 550° C. It is more preferable that the alloying temperature not be higher than 530° C.

It is preferable that the alloying time be 10 seconds or more and 60 seconds or less in consideration of problems associated with cost and control. It is more preferable that the alloying time not be more than 40 seconds. In the alloying, the method for heating does not need to be particularly limited, and any of the methods known in the art, such as radiation heating, conduction heating, or high-frequency induction heating, may be used. After the alloying is carried out, the steel sheet is cooled to room temperature. Treatments after coating application do not need to be particularly limited, and it is possible to perform temper rolling to adjust the material, perform leveling or the like to make an adjustment for a flat shape, and, as necessary, perform a usual after-treatment, such as chromating.

EXAMPLES

Next, aspects of the present invention will be described in detail based on examples, but the present invention is not limited to the examples.

Steel slabs including components as shown in Table 1 were used. Casting was performed using a known method, and subsequently, under the conditions shown in Table 2, hot rolling, light rolling, continuous annealing, and hot-dip galvanizing were performed, and, for some of the samples, alloying was additionally performed.

For performing the hot-dip galvanizing, the temperature of the galvanizing bath was 460° C., and the coating weight was adjusted to 50 g/m$^2$ by wiping. The alloying was performed at an alloying temperature of 530° C.

The following tests were conducted on the galvanized steel sheets obtained as described above to evaluate the surface appearance of the coating, coating adhesion, and post-processing corrosion resistance. The methods for measurement and the evaluation criteria are described below.

Amounts of Si and Mn in Galvanized Layer

The amounts of Si and Mn in the galvanized layer were measured by dissolving the coating layer in hydrofluoric acid containing an inhibitor added thereto and using ICP emission spectrometry.

Specific Surface Area Ratio, r, of Surface of Steel Sheet

For the surface of the steel sheet after the dissolution of the coating layer was performed, scanning of the surface topography was performed with a laser microscope (VK-X250, manufactured by KEYENCE CORPORATION). Examination and analysis were performed at an examination magnification of 3000× and under the conditions including a Z-axis resolution of 0.5 nm and X-axis and Y-axis resolutions of 0.1 µm. Furthermore, to derive the area ratio, five fields of view were randomly selected for each of the steel sheets, and the specific surface area ratio, r, was determined as the average.

Tensile Strength (TS)

A JIS No. 5 tensile test piece (JIS Z 2201) was cut from a hot-dip galvanized steel sheet (GI) or a hot-dip galvannealed steel sheet (GA) in a direction perpendicular to the rolling direction. TS was determined by conducting a tensile test in accordance with the specification of JIS Z 2241 at a strain rate of $10^{-3}$/s.

Appearance

With regard to appearance, appearance after hot-dip galvanizing and appearance after alloying were visually examined, and symbols (A,B) were assigned according to the following criteria.

A Neither bare spot nor alloying unevenness was present
B Bare spot and/or alloying unevenness were present Coating Adhesion The coating adhesion of the galvanized steel sheet was evaluated by conducting a ball impact test. The ball impact test was conducted under the conditions including a ball weight of 2.8 kg and a drop height of 1 m. Tape applied to a worked portion was peeled off, and the presence or absence of peeling-off of the coating layer was visually determined.

Symbols (A,B) were assigned according to the following criteria.

A No peeling-off of coating layer occurred
B Peeling-off of coating layer occurred Powdering Resistance The coating adhesion of the hot-dip galvannealed steel sheet was evaluated by testing powdering resistance. Cellophane tape was applied to a hot-dip galvannealed steel sheet, bending at 90 degrees was applied to the taped surface, which was followed by straightening, and then the tape was peeled off. On the basis of portions of the steel sheet adhering to the peeled-off tape, the amount of peeling-off of the coating in a bent-back portion of 10 mm×40 mm was measured by determining the number of Zn counts by using X-ray fluorescence. The amount was evaluated according to the following criteria, and symbols (A,B,C) were assigned. The greater the number of Zn counts determined by using X-ray fluorescence, the lower the powdering resistance.

X-ray fluorescence zinc count number Rank
Less than 3000: A (Good)
3000 or greater and less than 6000: B
6000 or greater: C (Poor)

Post-Processing Corrosion Resistance

A test piece was prepared by processing similar to that for the coating peel-off resistance test except that peeling-off of tape was not performed. Chemical conversion was performed on the test piece in a manner such that the chemical conversion film had a coating weight of 1.7 to 3.0 g/m². For the chemical conversion, FC-E2011, which is a degreasing agent, PL-X, which is a surface modifying agent, and Palbond PB-L3065, which is a chemical conversion agent, each manufactured by Nihon Parkerizing Co., Ltd., were used, and standard conditions were applied as described below.

<Standard Conditions>
Degreasing step: treatment temperature is 40° C.; and treatment time is 120 seconds.
Spray degreasing and surface modification step: pH, 9.5; treatment temperature is room temperature; and treatment time is 20 seconds.
Chemical conversion step: temperature of chemical conversion liquid is 35° C.; and treatment time is 120 seconds.

Electrodeposition was performed using V-50, which is an electrodeposition paint manufactured by Nippon Paint Co., Ltd., on the surface of the test piece subjected to the chemical conversion, in a manner such that a film thickness became 25 μm. The test piece was subjected to a corrosion test described below.

<Salt Spray Test (SST)>

Cross-cut marks were formed with a cutter on the test piece subjected to chemical conversion and electrodeposition, in a manner such that the cut marks reached the coating. The cross-cut marks were formed on the surface of a bent portion of hot-dip galvannealed steel sheets and on a ball impact portion of galvanized steel sheets. Subsequently, the test piece was subjected to a salt spray test in accordance with the neutral salt spray test specified in JIS Z 2371:2000 for 240 hours by using a 5 mass % NaCl aqueous solution. Subsequently, a tape peel-off test was conducted on the cross-cut mark portions, and a maximum peel-off whole width, which is the sum of peel-off widths in the left and right cut mark portions, was measured. Symbols (A,B) were assigned according to the following criteria. A corrosion resistance as determined by the salt spray test can be rated as "good" if the maximum peel-off whole width is less than or equal to 2.0 mm.

A: Maximum peel-off whole width with respect to cut mark was less than or equal to 2.0 mm
B: Maximum peel-off whole width with respect to cut mark was greater than 2.0 mm The results, together with the conditions, are shown in Table 2.

TABLE 1

| Steel sample | Mass % | | | | | | | | | | | Notes |
| --- | --- | --- | --- | --- | --- | --- | --- | --- | --- | --- | --- | --- |
| | C | Si | Mn | P | S | Al | Ti | Nb | V | Mo | W | |
| A | 0.070 | 0.05 | 1.50 | 0.008 | 0.0008 | 0.030 | 0 | 0 | 0 | 0 | 0 | Invention example |
| B | 0.065 | 0.10 | 2.60 | 0.008 | 0.0008 | 0.043 | 0.013 | 0.02 | 0.048 | 0 | 0 | Invention example |
| C | 0.070 | 0.25 | 1.50 | 0.005 | 0.0010 | 0.005 | 0.150 | 0 | 0 | 0 | 0.02 | Invention example |
| D | 0.100 | 0.45 | 2.10 | 0.010 | 0.0008 | 0.046 | 0.026 | 0.026 | 0.042 | 0.06 | 0 | Invention example |
| E | 0.080 | 0.65 | 1.20 | 0.015 | 0.0010 | 0.040 | 0.020 | 0.010 | 0 | 0.03 | 0 | Invention example |
| F | 0.070 | 1.30 | 1.40 | 0.005 | 0.0080 | 0.005 | 0.100 | 0.015 | 0 | 0.03 | 0 | Invention example |
| G | 0.085 | 2.10 | 2.12 | 0.008 | 0.0008 | 0.045 | 0.025 | 0.025 | 0.045 | 0.05 | 0 | Invention example |
| H | 0.070 | 0.70 | 3.10 | 0.005 | 0.0010 | 0.005 | 0.150 | 0 | 0.150 | 0 | 0 | Comparative example |
| I | 0.085 | 2.70 | 2.05 | 0.008 | 0.0008 | 0.005 | 0.040 | 0.025 | 0 | 0.05 | 0 | Comparative example |
| J | 0.065 | 0.05 | 0.24 | 0.008 | 0.0010 | 0.020 | 0 | 0 | 0 | 0 | 0 | Comparative example |
| K | 0.280 | 0.60 | 1.90 | 0.005 | 0.0010 | 0.015 | 0.050 | 0 | 0 | 0 | 0 | Invention example |
| L | 0.070 | 0.55 | 2.90 | 0.005 | 0.0010 | 0.020 | 0.050 | 0 | 0 | 0 | 0 | Invention example |
| M | 0.060 | 2.60 | 2.15 | 0.008 | 0.0008 | 0.005 | 0.040 | 0 | 0 | 0 | 0 | Comparative example |

TABLE 2

| No | Steel sample used | Finish rolling temperature (° C.) | Coiling temperature (° C.) | Impact pressure of high-pressure water in descaling (MPa) | Roll Roughness (Ra) | Rolling reduction ratio (%) | Hydrogen concentration (vol %) | Dew point (° C.) | Steel sheet end-point temperature (° C.) | Alloying | Specific surface area ratio (r) | Amount of Si in coating (g/m²) |
| --- | --- | --- | --- | --- | --- | --- | --- | --- | --- | --- | --- | --- |
| 1 | A | 920 | 500 | 0.5 | 0.5 | 1 | 10.1 | −30 | 700 | Yes | 1.71 | 0.012 |
| 2 | A | 940 | 550 | 0.5 | 0.4 | 3 | 15.8 | −45 | 850 | Yes | 1.54 | 0.015 |

TABLE 2-continued

| No | | | | | | | | | | | | |
|---|---|---|---|---|---|---|---|---|---|---|---|---|
| 3 | B | 850 | 450 | 0.8 | 0.3 | 1 | 8.2 | −40 | 620 | No | 1.77 | 0.008 |
| 4 | B | 950 | 600 | 0.5 | 0.4 | 0.1 | 8.2 | −35 | 780 | Yes | 2.59 | 0.022 |
| 5 | B | 920 | 500 | 0.8 | 0.5 | 2 | 10.1 | −30 | 700 | Yes | 1.69 | 0.012 |
| 6 | B | 920 | 550 | 0.8 | 0.4 | 3 | 15.8 | −45 | 920 | Yes | 1.71 | 0.019 |
| 7 | B | 980 | 500 | 0.8 | 0.3 | 5 | 12.2 | −35 | 580 | Yes | 1.59 | 0.007 |
| 8 | C | 850 | 500 | 0.8 | 0.3 | 0.1 | 9.8 | −35 | 590 | No | 2.65 | 0.012 |
| 9 | C | 920 | 500 | 1.1 | 0.4 | 3 | 9.8 | −20 | 700 | No | 1.51 | 0.015 |
| 10 | C | 920 | 550 | 1.1 | 0.4 | 5 | 7.5 | −35 | 750 | Yes | 1.41 | 0.016 |
| 11 | C | 980 | 600 | 1.3 | 0.4 | 7 | 12.2 | −45 | 980 | Yes | 1.36 | 0.033 |
| 12 | D | 900 | 550 | 0.5 | 0.4 | 0.2 | 7.8 | −35 | 720 | No | 2.69 | 0.017 |
| 13 | D | 940 | 480 | 1.3 | 0.5 | 8 | 10.1 | −35 | 720 | No | 1.34 | 0.018 |
| 14 | D | 940 | 550 | 1.3 | 0.5 | 10 | 8.1 | −30 | 670 | Yes | 1.18 | 0.016 |
| 15 | E | 950 | 550 | 1.1 | 0.4 | 0.1 | 3.5 | −40 | 660 | Yes | 2.89 | 0.024 |
| 16 | E | 950 | 550 | 1.3 | 0.4 | 1 | 5.6 | −35 | 680 | Yes | 2.42 | 0.022 |
| 17 | E | 940 | 480 | 1.1 | 1.3 | 1 | 8.2 | −35 | 750 | Yes | 2.85 | 0.036 |
| 18 | E | 950 | 580 | 0.8 | 0.5 | 3 | 10.2 | −40 | 650 | Yes | 1.67 | 0.024 |
| 19 | E | 900 | 580 | 1.3 | 0.4 | 5 | 7.8 | −35 | 700 | Yes | 1.43 | 0.025 |
| 20 | E | 900 | 610 | 1.6 | 0.4 | 7 | 10.2 | −25 | 720 | Yes | 1.34 | 0.031 |
| 21 | E | 850 | 520 | 0.8 | 0.6 | 10 | 12.5 | −50 | 780 | Yes | 1.22 | 0.045 |
| 22 | E | 950 | 580 | 0.8 | 0.1 | 3 | 11.5 | −35 | 700 | No | 2.23 | 0.032 |
| 23 | E | 850 | 550 | 1.1 | 0.4 | 1 | 7.8 | −40 | 670 | No | 1.96 | 0.025 |
| 24 | E | 960 | 630 | 1.3 | 0.4 | 3 | 9.8 | −50 | 740 | No | 2.03 | 0.028 |
| 25 | E | 980 | 600 | 1.5 | 0.4 | 5 | 20.8 | −32 | 700 | No | 1.71 | 0.025 |
| 26 | E | 950 | 550 | 1.3 | 0.4 | 1 | 7.8 | −40 | 650 | Yes | 1.91 | 0.023 |
| 27 | E | 950 | 480 | 0.8 | 0.3 | 3 | 10.2 | −50 | 700 | Yes | 2.34 | 0.025 |
| 28 | E | 950 | 520 | 1.1 | 0.3 | 5 | 10.8 | −35 | 720 | Yes | 1.74 | 0.026 |
| 29 | E | 900 | 450 | 0.5 | 0.3 | 0.4 | 10.2 | −40 | 850 | Yes | 3.12 | 0.052 |
| 30 | E | 980 | 720 | 0.8 | 0.5 | 1 | 7.5 | −45 | 850 | Yes | 2.18 | 0.027 |
| 31 | E | 1020 | 600 | 0.2 | 0.4 | 3 | 12.5 | −45 | 780 | Yes | 1.88 | 0.029 |
| 32 | F | 850 | 500 | 1.6 | 0.5 | 3 | 10.8 | −50 | 700 | No | 1.78 | 0.028 |
| 33 | F | 900 | 550 | 1.5 | 0.5 | 5 | 10.2 | −50 | 720 | No | 1.56 | 0.032 |
| 34 | G | 920 | 450 | 1.3 | 0.7 | 10 | 12.3 | −55 | 750 | No | 1.23 | 0.042 |
| 35 | H | 940 | 600 | 1.1 | 0.5 | 0.2 | 12.2 | −40 | 750 | Yes | 2.80 | 0.032 |
| 36 | H | 900 | 550 | 1.1 | 0.5 | 5 | 10.8 | −40 | 800 | Yes | 1.89 | 0.039 |
| 37 | I | 850 | 500 | 0.5 | 0.5 | 0.3 | 7.8 | −35 | 750 | No | 3.18 | 0.078 |
| 39 | I | 900 | 550 | 0.8 | 0.5 | 10 | 12.2 | −40 | 720 | No | 1.29 | 0.052 |
| 40 | J | 950 | 520 | 0.5 | 0.3 | 1 | 10.1 | −30 | 770 | Yes | 1.71 | 0.011 |
| 41 | K | 950 | 520 | 1.2 | 0.3 | 5 | 10.8 | −40 | 800 | Yes | 1.64 | 0.035 |
| 42 | L | 900 | 550 | 1.5 | 0.5 | 5 | 10.2 | −50 | 770 | No | 1.46 | 0.017 |
| 43 | M | 900 | 550 | 0.8 | 0.5 | 10 | 12.2 | −45 | 740 | No | 1.31 | 0.048 |

| No | Amount of Mn in coating (g/m$^2$) | Si amount × r (g/m$^2$) | Mn amount × r (g/m$^2$) | Tensile strength (MPa) | Appearance | Coating adhesion | Powdering resistance | Post-processing corrosion resistance | Notes |
|---|---|---|---|---|---|---|---|---|---|
| 1 | 0.023 | 0.021 | 0.039 | 650 | A | — | A | A | Invention example |
| 2 | 0.032 | 0.023 | 0.049 | 595 | A | — | A | A | Invention example |
| 3 | 0.016 | 0.014 | 0.028 | 720 | A | A | — | A | Invention example |
| 4 | 0.066 | 0.057 | 0.171 | 820 | B | — | C | B | Comparative example |
| 5 | 0.029 | 0.020 | 0.049 | 785 | A | — | A | A | Invention example |
| 6 | 0.041 | 0.033 | 0.070 | 930 | A | — | A | A | Invention example |
| 7 | 0.013 | 0.011 | 0.021 | 725 | A | — | B | A | Invention example |
| 8 | 0.008 | 0.032 | 0.021 | 602 | A | B | — | B | Comparative example |
| 9 | 0.018 | 0.023 | 0.027 | 650 | A | A | — | A | Invention example |
| 10 | 0.034 | 0.023 | 0.048 | 695 | A | — | A | A | Invention example |
| 11 | 0.050 | 0.045 | 0.068 | 803 | A | — | B | A | Invention example |
| 12 | 0.039 | 0.046 | 0.105 | 840 | B | B | — | B | Comparative example |
| 13 | 0.036 | 0.024 | 0.048 | 835 | A | A | — | A | Invention example |
| 14 | 0.022 | 0.019 | 0.026 | 752 | A | — | A | A | Invention example |
| 15 | 0.008 | 0.069 | 0.023 | 792 | B | — | C | B | Comparative example |
| 16 | 0.012 | 0.053 | 0.029 | 788 | A | — | B | A | Invention example |
| 17 | 0.055 | 0.103 | 0.157 | 722 | B | — | C | B | Comparative example |
| 18 | 0.008 | 0.040 | 0.013 | 775 | A | — | A | A | Invention example |
| 19 | 0.012 | 0.036 | 0.017 | 750 | A | — | A | A | Invention example |
| 20 | 0.025 | 0.041 | 0.033 | 735 | A | — | A | A | Invention example |
| 21 | 0.009 | 0.055 | 0.011 | 689 | A | — | A | A | Invention example |
| 22 | 0.023 | 0.071 | 0.051 | 768 | A | B | — | B | Comparative example |
| 23 | 0.008 | 0.049 | 0.016 | 789 | A | A | — | A | Invention example |
| 24 | 0.015 | 0.057 | 0.030 | 723 | A | A | — | A | Invention example |
| 25 | 0.013 | 0.043 | 0.022 | 744 | A | A | — | A | Invention example |
| 26 | 0.006 | 0.044 | 0.011 | 803 | A | — | A | A | Invention example |
| 27 | 0.014 | 0.059 | 0.033 | 731 | A | — | A | A | Invention example |
| 28 | 0.015 | 0.045 | 0.026 | 708 | A | — | A | A | Invention example |
| 29 | 0.018 | 0.162 | 0.056 | 605 | A | — | C | B | Comparative example |
| 30 | 0.023 | 0.059 | 0.050 | 615 | A | — | B | A | Invention example |
| 31 | 0.027 | 0.054 | 0.051 | 702 | A | — | B | A | Invention example |
| 32 | 0.021 | 0.050 | 0.037 | 760 | A | A | — | A | Invention example |
| 33 | 0.024 | 0.050 | 0.038 | 856 | A | A | — | A | Invention example |
| 34 | 0.034 | 0.052 | 0.042 | 975 | A | A | — | A | Invention example |

TABLE 2-continued

| 35 | 0.048 | 0.090 | 0.134 | 920  | A | —  | C | B | Comparative example |
|----|-------|-------|-------|------|---|----|---|---|---------------------|
| 36 | 0.062 | 0.074 | 0.117 | 1050 | A | —  | C | B | Comparative example |
| 37 | 0.032 | 0.248 | 0.102 | 951  | A | B  | — | B | Comparative example |
| 39 | 0.029 | 0.067 | 0.037 | 886  | A | B  | — | B | Comparative example |
| 40 | 0.008 | 0.019 | 0.014 | 420  | A | —  | A | A | Comparative example |
| 41 | 0.036 | 0.057 | 0.059 | 1120 | A | —  | A | A | Invention example   |
| 42 | 0.048 | 0.025 | 0.070 | 923  | A | A  | — | A | Invention example   |
| 43 | 0.021 | 0.063 | 0.028 | 886  | A | B  | — | B | Comparative example |

Table 2 demonstrates that Invention Examples have good surface appearance, good coating adhesion (powdering resistance), and good post-processing corrosion resistance. In contrast, Comparative Examples are unsatisfactory in terms of at least one of surface appearance, coating adhesion (powdering resistance), and post-processing corrosion resistance.

INDUSTRIAL APPLICABILITY

The high-strength galvanized hot-rolled steel sheet according to aspects of the present invention is suitable for use in automotive parts, for which, in recent years, designing for increased strength and reduced thickness has been rapidly advanced.

The invention claimed is:

1. A high-strength galvanized hot-rolled steel sheet comprising:
    a steel sheet having a chemical composition; and
    a galvanized layer disposed on the steel sheet having the chemical composition, the chemical composition including, in mass %,
    C in the range of 0.02% to 0.30%,
    S in the range of 0.01% to 2.5%,
    Mn in the range of 0.3% to 3.0%,
    P in the range of 0.08% or less,
    S in the range of 0.02% or less, and
    Al in the range of 0.001% to 0.20%, with a balance of Fe and incidental impurities,
    the galvanized layer having a coating weight per side of 20 to 120 g/m$^2$, wherein
    a surface of the steel sheet having the chemical composition has a specific surface area ratio, r, of 2.5 or less, and
    an amount (g/m$^2$) of Si present in the galvanized layer and an amount (g/m$^2$) of Mn present in the galvanized layer respectively satisfy:
    amount of Si×r≤0.06, and
    amount of Mn×r≤0.10
    wherein the high-strength galvanized hot-rolled steel sheet has a tensile strength of 590 MPa or greater.

2. The high-strength galvanized hot-rolled steel sheet according to claim 1, wherein the chemical composition further includes, in mass %, one or more of the following components:
    Ti in the range of 0.01% to 0.40%,
    Nb in the range of 0.001% to 0.200%,
    V in the range of 0.001% to 0.500%,
    Mo in the range of 0.01% to 0.50%, and
    W in the range of 0.001% to 0.200%.

3. A method for manufacturing a high-strength galvanized hot-rolled steel sheet of claim 1, the method comprising:
    hot-rolling and pickling a steel slab having the chemical composition according to claim 1;
    subsequently, performing rolling by using a roll having a surface roughness (Ra) of 0.3 to 1.0 μm at a rolling reduction ratio of 1 to 10%; and
    subsequently, performing hot-dip galvanizing.

4. The method for manufacturing a high-strength galvanized hot-rolled steel sheet according to claim 3, wherein,
    in the hot-rolling, descaling by high-pressure water spraying is performed at an impact pressure of 0.3 MPa or greater and less than 1.8 MPa after rough rolling and prior to finish rolling,
    the finish rolling is performed at a finish rolling temperature of 800° C. or higher, and
    coiling is performed at a coiling temperature of 400 to 650° C.

5. The method for manufacturing a high-strength galvanized hot-rolled steel sheet according to claim 4, wherein, prior to the hot-dip galvanizing, continuous annealing is performed in a furnace atmosphere having a hydrogen concentration of 2 to 30 vol % and a dew point of −60 to −10° C., with a steel sheet end-point temperature being 600 to 950° C.

6. The method for manufacturing a high-strength galvanized hot-rolled steel sheet according to claim 5, the method further comprising performing alloying after the hot-dip galvanizing.

7. The method for manufacturing a high-strength galvanized hot-rolled steel sheet according to claim 4, the method further comprising performing alloying after the hot-dip galvanizing.

8. The method for manufacturing a high-strength galvanized hot-rolled steel sheet according to claim 3, wherein, prior to the hot-dip galvanizing, continuous annealing is performed in a furnace atmosphere having a hydrogen concentration of 2 to 30 vol % and a dew point of −60 to −10° C., with a steel sheet end-point temperature being 600 to 950° C.

9. The method for manufacturing a high-strength galvanized hot-rolled steel sheet according to claim 8, the method further comprising performing alloying after the hot-dip galvanizing.

10. The method for manufacturing a high-strength galvanized hot-rolled steel sheet according to claim 3, the method further comprising performing alloying after the hot-dip galvanizing.

11. A method for manufacturing a high-strength galvanized hot-rolled steel sheet of claim 2, the method comprising:
    hot-rolling and pickling a steel slab having the chemical composition according to claim 2;
    subsequently, performing rolling by using a roll having a surface roughness (Ra) of 0.3 to 1.0 μm at a rolling reduction ratio of 1 to 10%; and
    subsequently, performing hot-dip galvanizing.

12. The method for manufacturing a high-strength galvanized hot-rolled steel sheet according to claim 11, the method further comprising performing alloying after the hot-dip galvanizing.

13. The method for manufacturing a high-strength galvanized hot-rolled steel sheet according to claim 11, wherein,
- in the hot-rolling, descaling by high-pressure water spraying is performed at an impact pressure of 0.3 MPa or greater and less than 1.8 MPa after rough rolling and prior to finish rolling,
- the finish rolling is performed at a finish rolling temperature of 800° C. or higher, and
- coiling is performed at a coiling temperature of 400 to 650° C.

14. The method for manufacturing a high-strength galvanized hot-rolled steel sheet according to claim 13, wherein, prior to the hot-dip galvanizing, continuous annealing is performed in a furnace atmosphere having a hydrogen concentration of 2 to 30 vol % and a dew point of −60 to −10° C., with a steel sheet end-point temperature being 600 to 950° C.

15. The method for manufacturing a high-strength galvanized hot-rolled steel sheet according to claim 14, the method further comprising performing alloying after the hot-dip galvanizing.

16. The method for manufacturing a high-strength galvanized hot-rolled steel sheet according to claim 13, the method further comprising performing alloying after the hot-dip galvanizing.

17. The method for manufacturing a high-strength galvanized hot-rolled steel sheet according to claim 11, wherein, prior to the hot-dip galvanizing, continuous annealing is performed in a furnace atmosphere having a hydrogen concentration of 2 to 30 vol % and a dew point of −60 to −10° C., with a steel sheet end-point temperature being 600 to 950° C.

18. The method for manufacturing a high-strength galvanized hot-rolled steel sheet according to claim 17, the method further comprising performing alloying after the hot-dip galvanizing.

\* \* \* \* \*

UNITED STATES PATENT AND TRADEMARK OFFICE
CERTIFICATE OF CORRECTION

Page 1 of 1

PATENT NO. : 10,927,441 B2
APPLICATION NO. : 16/481646
DATED : February 23, 2021
INVENTOR(S) : Masaki Koba et al.

It is certified that error appears in the above-identified patent and that said Letters Patent is hereby corrected as shown below:

In the Claims

Column 15 In Claim 1, Line 37, "S in the range" should read -- Si in the range --

Signed and Sealed this
Twentieth Day of July, 2021

Drew Hirshfeld
*Performing the Functions and Duties of the
Under Secretary of Commerce for Intellectual Property and
Director of the United States Patent and Trademark Office*